June 6, 1933.    E. G. STRECKFUSS    1,912,922
SLICING MACHINE
Filed March 29, 1928
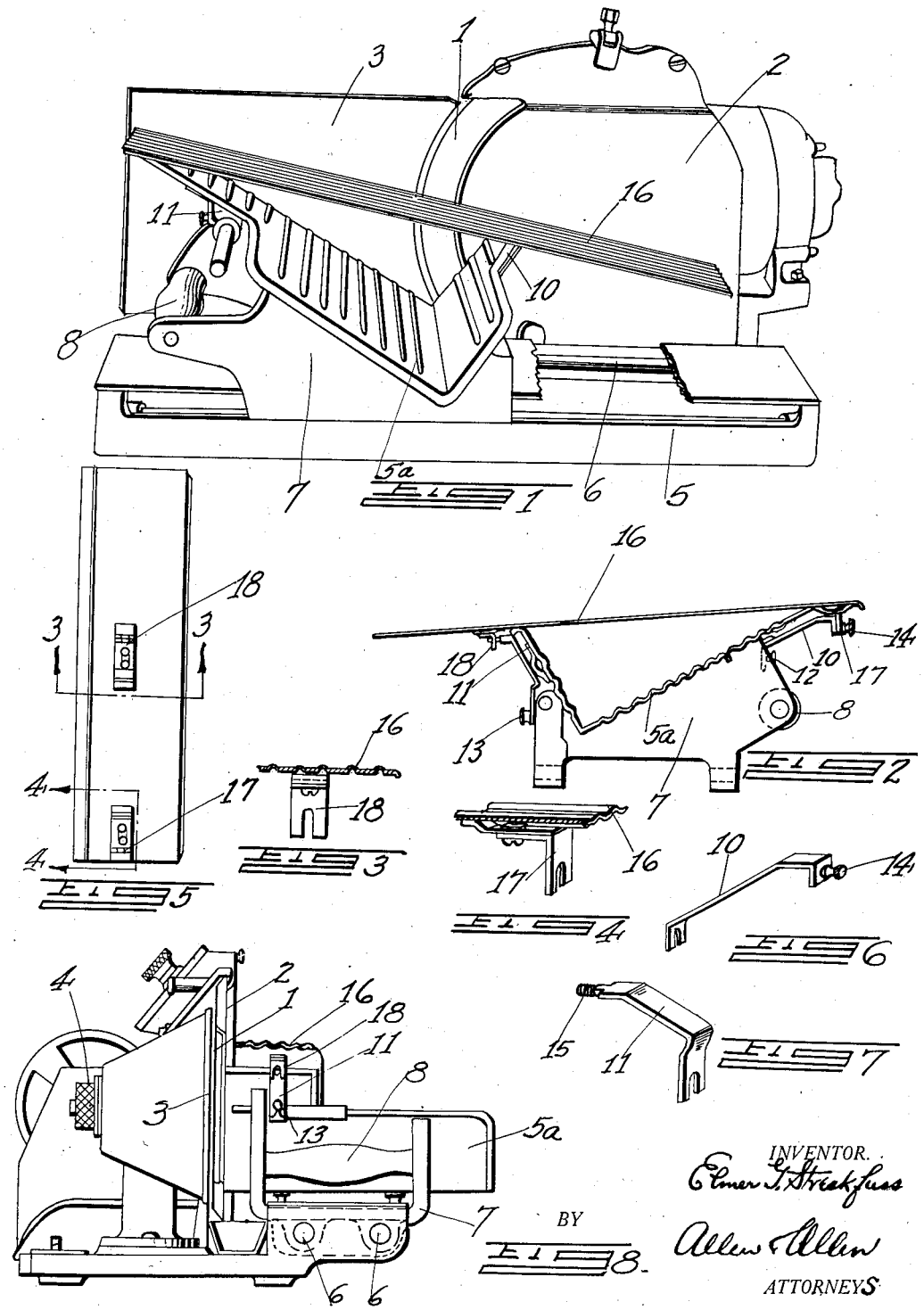

Patented June 6, 1933

1,912,922

UNITED STATES PATENT OFFICE

ELMER G. STRECKFUSS, OF CINCINNATI, OHIO, ASSIGNOR TO THE CINCINNATI TIME RECORDER COMPANY, OF CINCINNATI, OHIO, A CORPORATION OF OHIO

SLICING MACHINE

Application filed March 29, 1928. Serial No. 265,777.

My invention relates to slicing machines used for slicing meats and the like, and consists particularly in the provision of a structure upon which loaves of bread or other long objects can be laid and sliced, without modifying the structure of the slicing machine. So far as bread is concerned, the chief use of my invention is to remove the crust from the bread, leaving the body without crusts for making sandwiches.

It is the object of my invention to adapt a meat slicing machine of the type having a meat retaining tray of V-shaped or other hollow conformation into which a piece of meat is set, to the slicing of bread and other long objects, with a simple additional piece, which is arranged to be supported by and aligned and positioned by the meat tray.

While my invention is not adaptable to all meat slicers, particularly those in which the meat is held on a plate which is mechanically advanced toward a knife, it is generally adaptable to a large class of machines of a simpler type in which the meat or other object to be sliced is pressed by the operator against a gauging plate or slice adjusting plate, said plate being held at a predetermined position with relation to a knife and with relation to the tray.

My machine is particularly adapted for use with the type of slicing machine shown in the drawing, in which the knife is so arranged that the guard which covers all but its cutting edge is located in a single vertical plane parallel to the line of movement of the meat tray.

I accomplish my objects by that certain construction and arrangement of parts to be hereinafter more specifically pointed out and claimed.

In the drawing:—

Figure 1 is a perspective side view of a machine using my invention.

Figure 2 is an end elevation of the meat tray equipped with my invention.

Figure 3 is a detail section of the bread tray taken along the line 3—3 in the bottom plan view shown in Figure 5.

Figure 4 is a perspective of the other end of the tray showing the other detachable mounting device.

Figure 5 is a bottom plan view of the bread tray of my preferred embodiment.

Figure 6 is a perspective of one of the meat tray brackets.

Figure 7 is a perspective of the other one of the meat tray brackets.

Figure 8 is a front elevation of the device shown in side view in Figure 1.

I have shown a meat slicing machine which will not be described in detail, since the details of structure are not important in connection with my invention.

The knife is shown with its edge exposed at 1, and with its face otherwise covered by a guard 2 at the operator's side of the machine. The knife in the illustrated machine is rotated by means of a motor, and is set at a slight angle with relation to the axis of the machine so as to permit of the guard lying within a dished portion of the knife near the cutting edge.

The slice adjusting plate is shown at 3, and stands in a vertical plane parallel with the axis of the machine and with the edge of the knife. By adjusting the position of this plate as by means of the knob 4, the thickness of a slice can be adjusted with regard to any piece of material which is thrust against the plate and moved slidably along it past the knife.

Along one side of the machine is a frame or base portion 5 having a pair of ways or slide bars 6 therein on which slides a frame 7. The frame 7 has at one end a handle 8 for manipulating it, and the bars 6 lie in the axis of the machine generally parallel with the slice adjusting plate.

On this frame, in the illustrated machine, are brackets 10 and 11, one on each side of the machine, which brackets may be part of the meat supporting tray being suitably riveted or spot-welded thereto.

Thumbscrews 12 and 13 set into the frame 7 engage the lower ends of these two brackets, thus holding the meat tray in place on the sliding frame.

The meat tray itself, in accordance with the usual design, is formed with a V-shape, as at 5a, or some other cavity in shape, so that a piece of meat can be well braced therein while being sliced. The operator usually holds one hand on the meat, and with the other moves the tray back and forth. The meat is kept forced up against the slice adjusting plate, and moved along past the knife so as to be sliced to the desired thickness.

The brackets in the illustrated embodiment are provided in the one instance with a removable thumbscrew 14, and in the other instance with a threaded post 15 onto which a nut can be screwed.

In some other type of machine another type of thumbscrew or screw and nut device can be provided which is similarly located with respect to the meat tray.

The bread tray is built to correspond in structure to the particular machine for which it is designed. In the present case the location of the ends of the two brackets are the defining factors.

The tray is in the form of a long plate 16 having sufficient dimensions to support a loaf of bread, said tray being arranged to rest on the top edges of the meat tray.

On the under side of the bread tray are located a pair of forked clips 17 and 18, which clips are arranged to fit in the one case over the screw portion 15 on the bracket 10, and to fit over the thumbscrew 14 in the bracket 11.

The position of the brackets is such that the edge of the bread tray is in proximity to the edge of the meat tray and thus lies in juxtaposition with relation to the slice adjusting tray.

Thus the bread tray is detachably and quickly mounted on the meat tray and supported thereby, and is located in position by the clips and mounting devices. The operation of cutting bread is accomplished by placing the loaf of bread on the bread tray and sliding it along by hand without moving the meat tray, with the bread advanced by the hand so as to keep it against the slice adjusting tray. In this way the crust may be removed from an entire loaf in four movements.

In a similar manner the tray can be mounted on the top edges of any hollow meat supporting tray device in slicers of the general type described, and located with reference to the slice adjusting plate in the manner described. The device is also useful in slicing other long articles which cannot be sliced in the usual way, due to the limits of movement of the normal meat cutting operation.

Having thus described my invention, what I claim as new and desire to secure by Letters Patent, is:—

1. An attachment for a meat slicer of the type having a trough-shaped meat carriage and a slice adjusting plate comprising a long, flat stationary tray having means for its fixed attachment to the top of the meat carriage and resting thereon, said attaching means being so positioned as to regulate the position of the long, flat tray with relation to the slice adjusting plate of said machine.

2. An attachment for a meat slicer of the type having a trough-shaped meat carriage and a slice adjusting plate comprising a long, flat stationary tray having means for its fixed attachment to the top of the meat tray and resting thereon, said attaching means being so positioned as to regulate the position of the long, flat tray with relation to the slice adjusting plate, said attaching means being of the quick detachable type.

3. In combination with the supporting frame of a trough-shaped meat tray in a meat slicing machine of the slice adjuster plate type, and which has brackets whereby the meat tray is held in place on the supporting frame, and a knife guard, a long, flat tray arranged to be seated on the meat tray and to extend across the adjuster plate and the knife guard, and quick detachable connections between the flat tray and the meat tray brackets.

4. An attachment for a meat slicer of the type having a trough-shaped meat carriage, a slice adjusting plate, a long, flat stationary tray having means for its fixed attachment to the top of the meat tray and resting thereon, said attaching means being so positioned as to regulate the position of the long, flat tray with relation to the slice adjusting plate in such a way that the edge of the flat tray which is presented to the slice adjusting plate is substantially coincident with the edge of the hollow meat tray, which is presented to said slice adjusting plate.

5. In combination, a meat slicer having a trough-shaped meat carriage, a slice adjusting plate, a rotary knife and a knife guard plate toward which one end of the trough shape of the carriage opens, a bread tray attachment comprising a long flat stationary tray supported by the rims of said trough shaped carriage, extending across the adjusting plate and knife guard plate for the purposes described.

ELMER G. STRECKFUSS.